(12) United States Patent
Sawaya et al.

(10) Patent No.: US 9,710,248 B2
(45) Date of Patent: Jul. 18, 2017

(54) APPLICATION INSTALL AND LAYOUT SYNCING

(71) Applicant: Microsoft Corporation, Redmond, WA (US)

(72) Inventors: Samer Sawaya, Snoqualmie, WA (US); Henri-Charles Machalani, Seattle, WA (US); Clement Fauchere, Sammamish, WA (US); David Amenta, Redmond, WA (US); Bahram Bahram Pour, Woodinville, WA (US); Sarah McDevitt, Seattle, WA (US); Benjamin Srour, Seattle, WA (US); Thomas Alphin, Kirkland, WA (US); Marina Dukhon Taylor, Kirkland, WA (US); Chris McGuire, Monroe, WA (US); Robert Chester Macklin, Seattle, WA (US); Richard Duncan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 835 days.

(21) Appl. No.: 13/904,929

(22) Filed: May 29, 2013

(65) Prior Publication Data
US 2014/0359602 A1    Dec. 4, 2014

(51) Int. Cl.
G06F 9/445    (2006.01)
(52) U.S. Cl.
CPC . *G06F 8/61* (2013.01); *G06F 8/62* (2013.01)
(58) Field of Classification Search
None
See application file for complete search history.

(56) References Cited

U.S. PATENT DOCUMENTS 6,968,550 B2 * 11/2005 Branson .................... G06F 8/65
                                                     717/168
8,121,585 B2    2/2012 Commarford et al.
(Continued)

FOREIGN PATENT DOCUMENTS

EP    1227399 A2    7/2002
WO    99/63434 A1    12/1999

OTHER PUBLICATIONS

Tu, Hoang, "How to Sync Apps Across Devices and How to Turn off Windows Store", Retrieved at<<http://dottech.org/91287/windows-8-how-to-turn-off-windows-store-and-how-to-sync-apps-across-devices/>>, Dec. 28, 2012, pp. 4.
(Continued)

*Primary Examiner* — Insun Kang

(57) ABSTRACT

Embodiments described herein relate to synchronizing configuration information between devices associated with a user. The synchronized configuration information can relate to application installations and uninstallations as well as to user modifications to user interfaces for managing and invoking the applications. For example, layouts of application representations provided by respective application launchers on a user's respective devices are kept automatically synchronized when the user modifies any of the layouts. Installations and uninstallations are similarly synchronized between the user's devices. Installations and uninstallations that might stem from synchronization may be circumscribed in various ways, such as by allowing the user to specify whether specific applications are to be installed/uninstalled only on specific devices or globally, by filtering propagation of synchronization updates according to hardware or software features and incompatibilities, or others.

19 Claims, 8 Drawing Sheets

(56) References Cited

U.S. PATENT DOCUMENTS

| | | | |
|---|---|---|---|
| 8,261,253 B2 | 9/2012 | Brehm et al. | |
| 2003/0055927 A1 | 3/2003 | Fischer et al. | |
| 2006/0106881 A1 | 5/2006 | Leung et al. | |
| 2007/0150891 A1 | 6/2007 | Shapiro | |
| 2008/0028389 A1* | 1/2008 | Genty | G06F 8/61 |
| | | | 717/174 |
| 2011/0010699 A1 | 1/2011 | Cooper et al. | |
| 2011/0078332 A1 | 3/2011 | Poon | |
| 2011/0225178 A1* | 9/2011 | Ingrassia | G06F 17/30038 |
| | | | 707/769 |
| 2011/0302570 A1* | 12/2011 | Kurimilla | G06F 8/60 |
| | | | 717/170 |
| 2012/0079095 A1 | 3/2012 | Evans et al. | |
| 2012/0203862 A1 | 8/2012 | Tayeb et al. | |
| 2013/0018939 A1* | 1/2013 | Chawla | H04L 67/08 |
| | | | 709/203 |
| 2013/0275509 A1* | 10/2013 | Micucci | H04L 67/02 |
| | | | 709/204 |
| 2013/0332846 A1* | 12/2013 | Freedman | H01B 7/292 |
| | | | 715/745 |
| 2014/0115116 A1* | 4/2014 | Motes | H04L 67/02 |
| | | | 709/219 |
| 2014/0201144 A1* | 7/2014 | Vibhor | H04L 29/0854 |
| | | | 707/634 |
| 2014/0229436 A1* | 8/2014 | Wang | G06F 17/30174 |
| | | | 707/622 |
| 2014/0258350 A1* | 9/2014 | Duval | G06F 17/30174 |
| | | | 707/829 |
| 2014/0287818 A1* | 9/2014 | Chan | A63F 13/12 |
| | | | 463/24 |
| 2014/0289190 A1* | 9/2014 | Chan | G06F 9/54 |
| | | | 707/610 |
| 2015/0142983 A1* | 5/2015 | Yilmaz | H04L 67/1095 |
| | | | 709/227 |
| 2015/0244741 A1* | 8/2015 | Sinha | H04L 51/04 |
| | | | 726/1 |
| 2015/0334182 A1* | 11/2015 | Wu | H04L 67/1095 |
| | | | 707/620 |

OTHER PUBLICATIONS

Roche, Didier, "OneConf in Oneiric and the Way Forward", Retrieved at<<http://blog.didrocks.fr/post/OneConf-in-Oneiric-and-the-way-forward%E2%80%A6>>, Oct. 5, 2011, pp. 5.

"International Search Report & Written Opinion for PCT Patent Application No. PCT/US2013/060249", Mailed Date: Jan. 2, 2014, Filed Date: Sep. 18, 2013, 12 Pages.

"International Search Report & Written Opinion for PCT Application No. PCT/US2013/061079", Mailed Date: Jan. 24, 2014, Filed Date: Sep. 21, 2013, 10 pages.

"Office Action Issued in European Application No. 13771336.8", Mailed Date: May 10, 2017, 4 Pages.

* cited by examiner

182/182C

| configuration sync data - application installs |||||
|---|---|---|---|---|
| app ID | timestamp | status | same app | metadata |
| 34-546-3234 | 1/1/2013:4:56 | installed | (appID4, appID9, ... ) | ... |
| 00-622-4213 | 1/9/2013:12:56 | installed | ... | ... |
| 79-432-908 | 3/20/2013:9:15 | installing | ... | ... |
| ... | ... | ... | ... | ... |

182/182C

| configuration sync data - layout information ||||||
|---|---|---|---|---|---|
| app ID | position | type | group | size | color | metadata/settings |
| 34-546-3234 | 1 | A | 1 | 3 | 242 | ... |
| 00-622-4213 | 3 | B | 1 | 3 | 100 | ... |
| 79-432-908 | 2 | C | 2 | 1 | 58 | ... |
| ... | ... | ... | ... | ... | ... | ... |

190

| uninstall list ||
|---|---|
| app ID | metadata |
| 13-432-3410 | ... |
| 82-338-3916 | ... |
| 55-001-0072 | ... |

FIG. 5

APPLICATION INSTALL AND LAYOUT SYNCING

BACKGROUND

Modern computing devices are often able to be customized and configured by users. Such customizing may involve installing and uninstalling executable applications, arranging application tiles or icons within a graphical user interface such as an application launcher (or other type of graphical user shell or application), changing the appearance of user interface elements, and so forth. In addition, an individual person may have a variety of computing devices that the individual regularly uses. Sometimes a user may install and use some of the same application programs (i.e., applications that have highly similar user interface and algorithms) on the user's computing devices. In addition, the computing devices may have hardware or software incompatibilities that necessitate installing different revisions or platform-specific versions of the same applications, perhaps only on partially intersecting subsets of the user's computing devices.

As the inventors have observed, a user may invest time in configuring one computing device among a variety of computing devices controlled by the user. For the user to create parallel experiences when using each of their computing devices, that invested time may be invested for each of the user's computing devices. This duplicative customizing for different devices can be burdensome to the user. For example, a process of manually installing applications and customizing the layout and appearance of a user interface may need to be repeated across a mix of computing devices. Furthermore, perhaps due to hardware or software limitations of platforms or applications, a user's preferences and requirements may be only partially implemented, to varying degrees, on some of the user's computing devices. This may task the user with manually keeping track of what experience-synchronizing tasks are needed for which devices.

In view of these inventor observations, techniques related to synchronizing user configurations among the user's computing devices are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to synchronizing configuration information between devices associated with a user. The synchronized configuration information can relate to application installations and uninstallations as well as to user modifications to user interfaces for managing and invoking the applications. For example, layouts of application representations provided by respective application launchers on a user's respective devices are kept automatically synchronized when the user modifies any of the layouts. Installations and uninstallations are similarly synchronized between the user's devices. Installations and uninstallations that might stem from synchronization may be circumscribed in various ways, such as by allowing the user to specify whether specific applications are to be installed/uninstalled only on specific devices or globally, by filtering propagation of synchronization updates according to hardware or software features or incompatibilities, or others.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows examples of configuration synchronization data and an example of a do-not-install list.

DETAILED DESCRIPTION

Embodiments described below relate to synchronizing user configurations among the user's computing devices. Such configurations may include installations and uninstallations of applications as well as layouts of user interfaces, among others. This description of inventive embodiments will begin with an overview of cloud-linked computing and computing devices used therefor. Next, synchronizing configurations across devices will be discussed. This will be followed by implementation details and examples.

Figure 1:
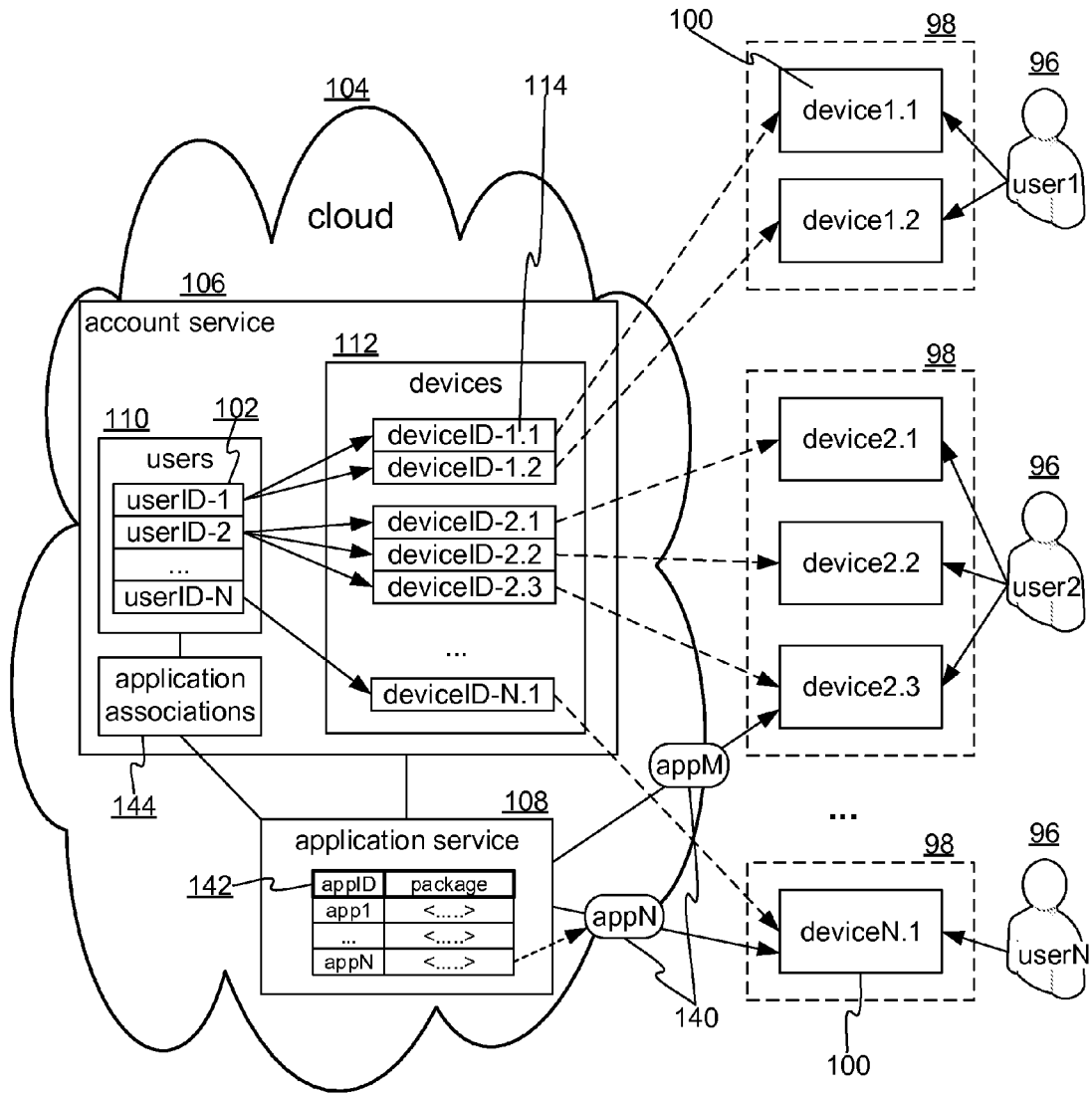
FIG. 1 shows an example of a multi-user multi-device cloud-oriented operating environment.

FIG. 1 shows an example of a multi-user multi-device cloud-oriented operating environment. Users 96 may use or control respective sets 98 of computing devices 100. Each user may have a user credential, user account, user identity 102, or some functional equivalent for distinguishing identity across computing devices forming and using a computing cloud 104. Account names, email accounts or addresses, and website accounts, are examples of user identities 102. Other information that can uniquely identify users can also serve as a user identity, such as a public key, a digitally signed certificate, a cookie, a hashtag, a biometric, etc. Such will be referred to as user identities 102.

The computing cloud 104 may be, for example, a suite of cooperating computing services, for example web services. The services may be accessed over a data network using a protocol stack including levels or layers of abstraction such as a transport layer, a network layer, an application layer, etc. Packets at one layer of the protocol stack may encapsulate packets or messages of another layer. At an application layer, packets might carry application-level information, for example invocations and results when applications installed by users 96 interact via a network with resources in the computing cloud 104 and when servers that form the cloud 104 interact via network to coordinate the various network resources or network-accessed computing services.

The computing devices 100 or servers providing these services or resources may have infrastructure that coordinates and facilitates cooperation among the servers, for example midware, clustering management, standby servers, data mirroring, virtual machine management, migration software, database engines, and so forth. Rudimentary computing clouds 104 may lack many or most of the features mentioned above. For example, the computing cloud 104 might be a single hardware server providing one or two software services such as an identity management or account service 106 and an application service 108. These services as well as possibly user computing devices 100 might use a data storage service, which is not shown in FIG. 1.

The account service 106 manages the user identities 102 that are used within the cloud 104 and on the user computing devices 100. The user identities might be stored in a table 110 or the like. For discussion herein, each user is assumed to have at least one user identity 102 that is unique at least within the cloud 104. A given user may have multiple computing devices that implicitly form a device group 98; a group 98 of user computing devices that use a same user identity 102 for presumably a same user when interacting with the cloud 104. As discussed further below, an embodiment may be implemented that allows a user to explicitly specify device subgroups and manage configuration synchronization on a by-subgroups basis.

Returning to FIG. 1, the account service 106 may also track user computing devices in a table or data store 112 of environment or device identifiers 114. A device identifier 114 uniquely identifies a hardware/software unit that might autonomously execute applications installed therein. A device identifier 114 might identify a user computing device, a hardware component of a computing device, an operating system instance, a virtual machine, an execution sandbox or application-virtualization environment, to name some examples.

Description herein that refers to a "user computing device", a "user device", or the like, in the context of synchronization, is deemed to also refer to any of a variety of general hardware/software units within which applications can be separately installed, executed, and user-configured. User devices might therefore encapsulate other user devices. In one embodiment, a user computing device is indeed a hardware device typically having a processor, non-volatile storage to store applications executed by the processor, a display, an operating system (or a software environment), network communication capabilities, and/or a user input device. The meaning of "computing device" refers to virtual machines or hardware machines such as laptops, workstations, smartphones, portable media players, tablets, set-top devices, electronic gaming devices, and others.

Figure 2:
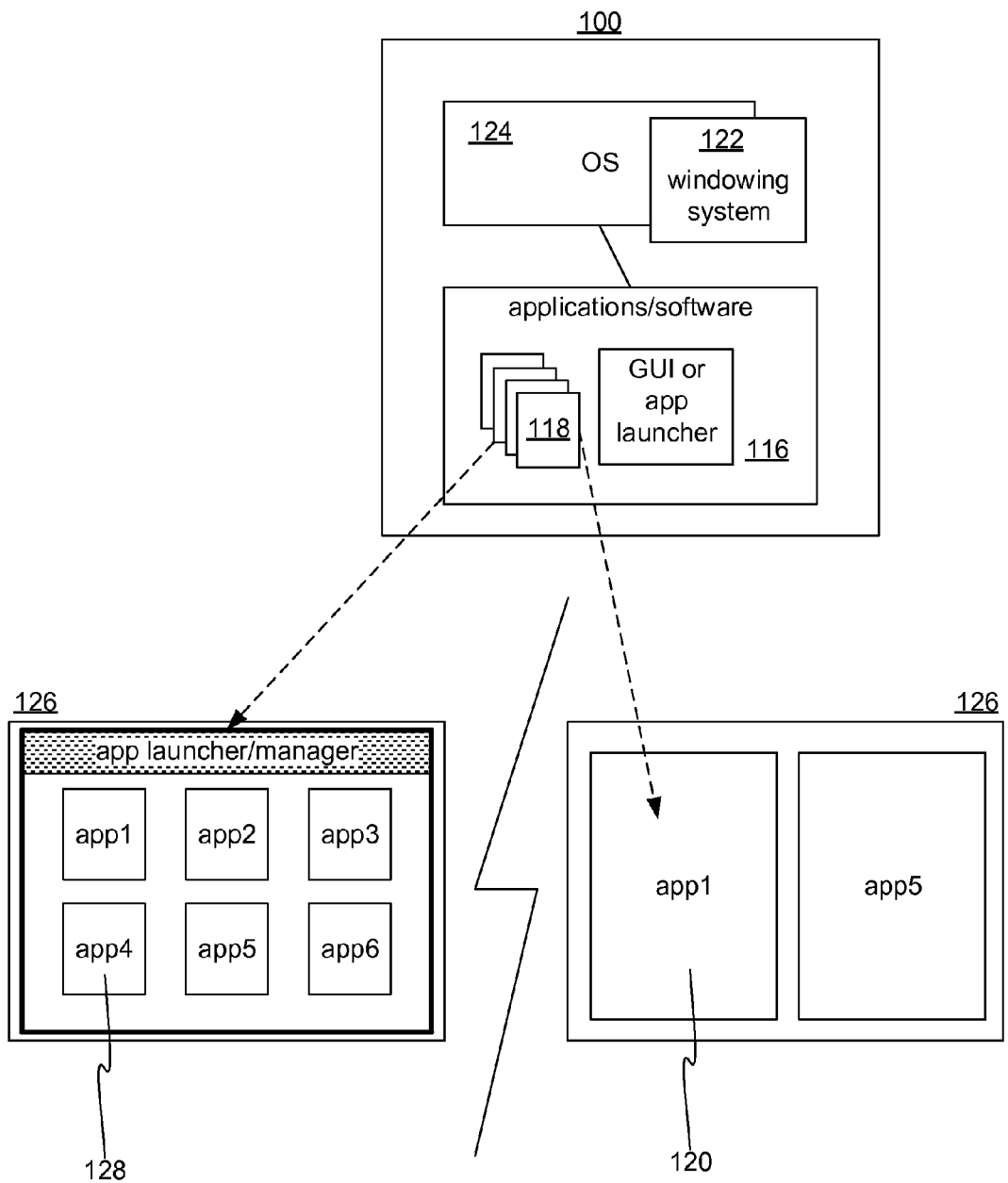
FIG. 2 shows a user computing device identified by a corresponding device identifier.

FIG. 2 shows a user computing device 100 identified by a corresponding device identifier 114. The computing device 100 may provide one or more user-configurable graphical user interfaces (GUIs) 116 for the user to interactively manage applications 118 (e.g., install/uninstall), interact with applications 118, or launch (newly execute and/or bring to the fore) windows 120 of the applications 118. Such a GUI 116 might be a lightweight client or web browser, a system GUI provided by or closely integrated with a windowing system 122 and/or an operating system 124, or an instance of a locally executing application 118 which might or might not be installable or uninstallable or replaceable by a user. The user-configurable GUI is displayed to the user by a display 126 of, or from a graphics signal outputted by, the computing device 100. The display 126 may be locally connected to the computing device 100 by way of a graphics port or display adapter of the computing device 100, via a local bus of the computing device 100, or by various network protocols designed to simulate bus-type connectivity.

The windowing system 122 may be integrated with or closely coupled with the operating system 124. For purposes herein, distinctions between these components are not significant; an operating system itself may be considered to be a windowing system. The windowing system 122 may have functionality that is known in the computing arts, such as handling input events (e.g., touches/strokes, clicks, keypresses, mouse drags, etc.) inputted by a user with various types of input devices. The windowing system 122 also manages the windows 120 by handling related events or user interactions such as closing windows, moving windows, resizing windows, directing input to windows, rendering multiple concurrent windows, and others. The windowing system 120 may also provide a background, system controls (user interface elements), or other GUI elements not specific to an application. As noted above an application launcher is an example of a GUI 116 or element thereof.

An application launcher is sometimes referred to as a "launcher", "switcher", a "graphical user shell", etc. An application launcher may be any software elements for allowing a user to interactively perform application-related tasks such as installing/uninstalling applications, opening/closing applications, toggling between application windows, configuring properties or behaviors of applications, displaying content from an application perhaps when the application is not open, and/or others.

Figure 7:
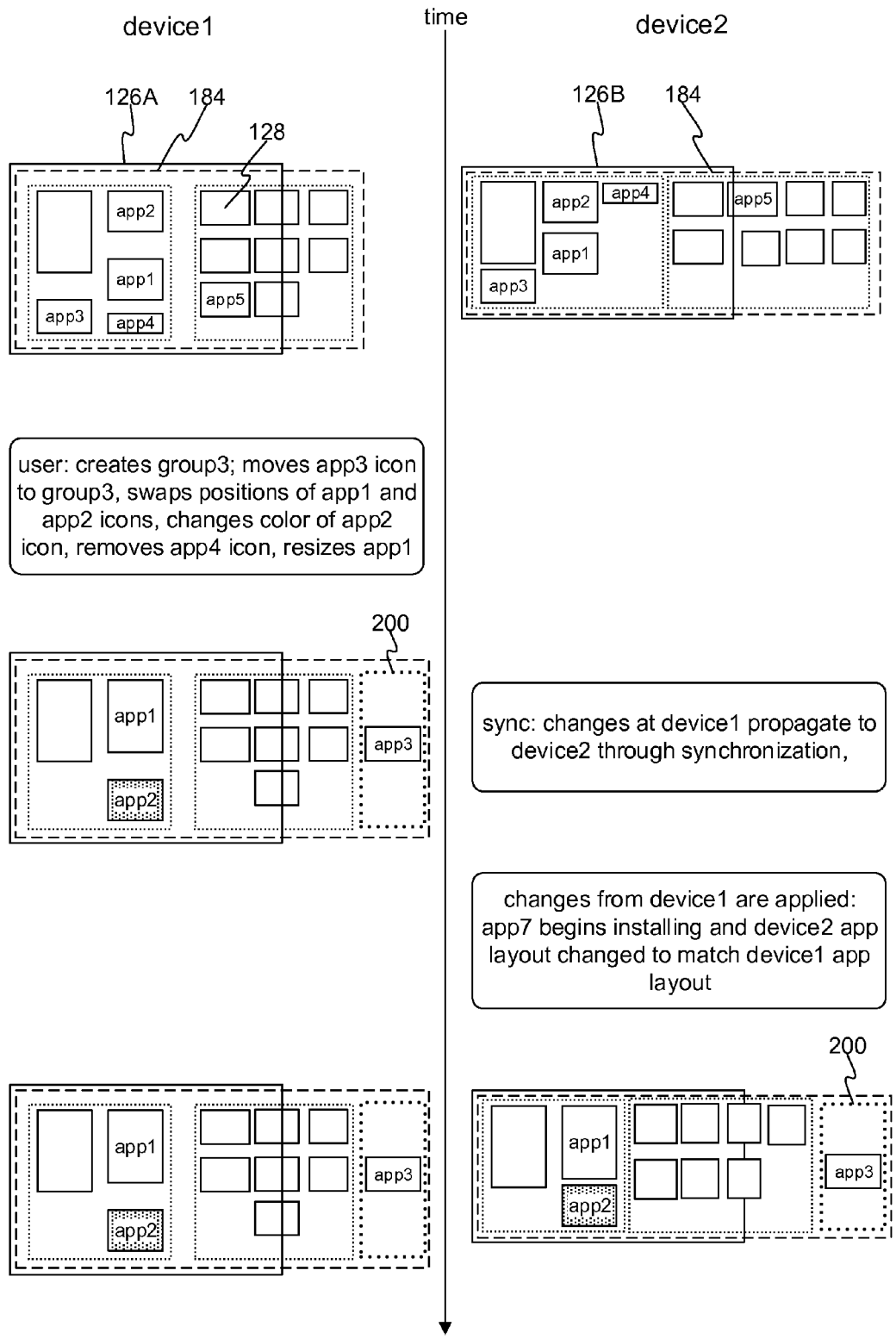
FIG. 7 shows an example of layout information synchronization.

An application launcher may be user-configurable, for instance having user-selected or user-arranged application representations 128 (e.g., icons, tiles presenting dynamic content) representing corresponding applications. As shown in the example of FIG. 7, an application launcher may be a pannable surface or may have navigable display areas (pages) that contain application user-arranged representations 128.

The application representations 128 may be part of a user-configurable layout of the application launcher; application representations may have user-configurable size, display order or position, appearance attributes such as colors or a graphic symbol, presence/absence, groups, categories, keywords, or other features. Collectively, these types of user-configurable parameters might also be termed "launcher layout configuration or settings" or "application representation layout/selection/arrangement information".

An application launcher may also include dashboard-like features such as a clock, a logout mechanism, network status information, system or application notifications, and so forth (some of which might be applications or gadgets). Activation or configuration of some such features may also be considered user-configurable launcher layout. For example, several types of settings could make use of synchronized application lists such as settings to allow/disallow applications to perform certain functions, or enable a list of applications that can function in the background, or applications that can present details on a lock screen type interface.

In some embodiments an application launcher is displayed or undisplayed by a user command, may be displayed in a full-screen mode, may partly overlay application windows, may be managed as a window object by the windowing system, may automatically hide or retract responsive to a user interaction, may be displayable by multiple displays of a computing device, etc. In some embodiments, an application launcher is undisplayed when a graphic application representation is actuated to open an application window; the opened application window may fully or partly displace or cover the application launcher. As discussed further below, such configurable features, in particular user-configurable features, may be automatically configured by synchronization between a group or subgroups of a user's computing devices.

An application representation 128, in addition to being a conduit for a user to open/close its application, to install/uninstall its application, or to switch-to or select its application, an application representation 128 may be a unit of content or link to content associated with a corresponding application, such as a Uniform Resource Locator (URL) associated with a browser application, a document or file, a link to a user profile or account that can be opened by a social network application, to name a few examples. As used herein, the term "launch" refers to both initially opening an application (e.g., starting a new process) as well as well as opening (displaying) the already-running (possibly dormant) application window for an application.

In addition to layout synchronization, embodiments herein may synchronize installations or uninstallations of applications between a user's computing devices or subgroups thereof. Referring again to FIG. 1, the application service 108 may be a network service or resource that transmits to a user's computing devices application packages, installation-enabling information, or other forms of application installs 140 such as install links, executables, setup programs, etc. The application service 108 may reside in a computing cloud other than the computing cloud 104 that has the account service 106.

The application service 108 or application store may function as a marketplace, may be curated by a controlling entity or organization, and may provide for online digital distribution of applications and possibly other content. Examples include the Apple™ App Store, Google Play™, the Windows Store™, and the Amazon Appstore™. The application service 108 may maintain a catalog 142 of applications identified by application identifiers. The account service 106 and/or the application service 108 may also maintain application associations 144 indicating which user identities have previously installed or purchased which applications. In either case, the account service 106 and the application service 108 may cooperate to track which applications have been installed by which users. Such information about an application may persist even when the user has uninstalled the application from one or more of the user's computing devices.

Figure 3:
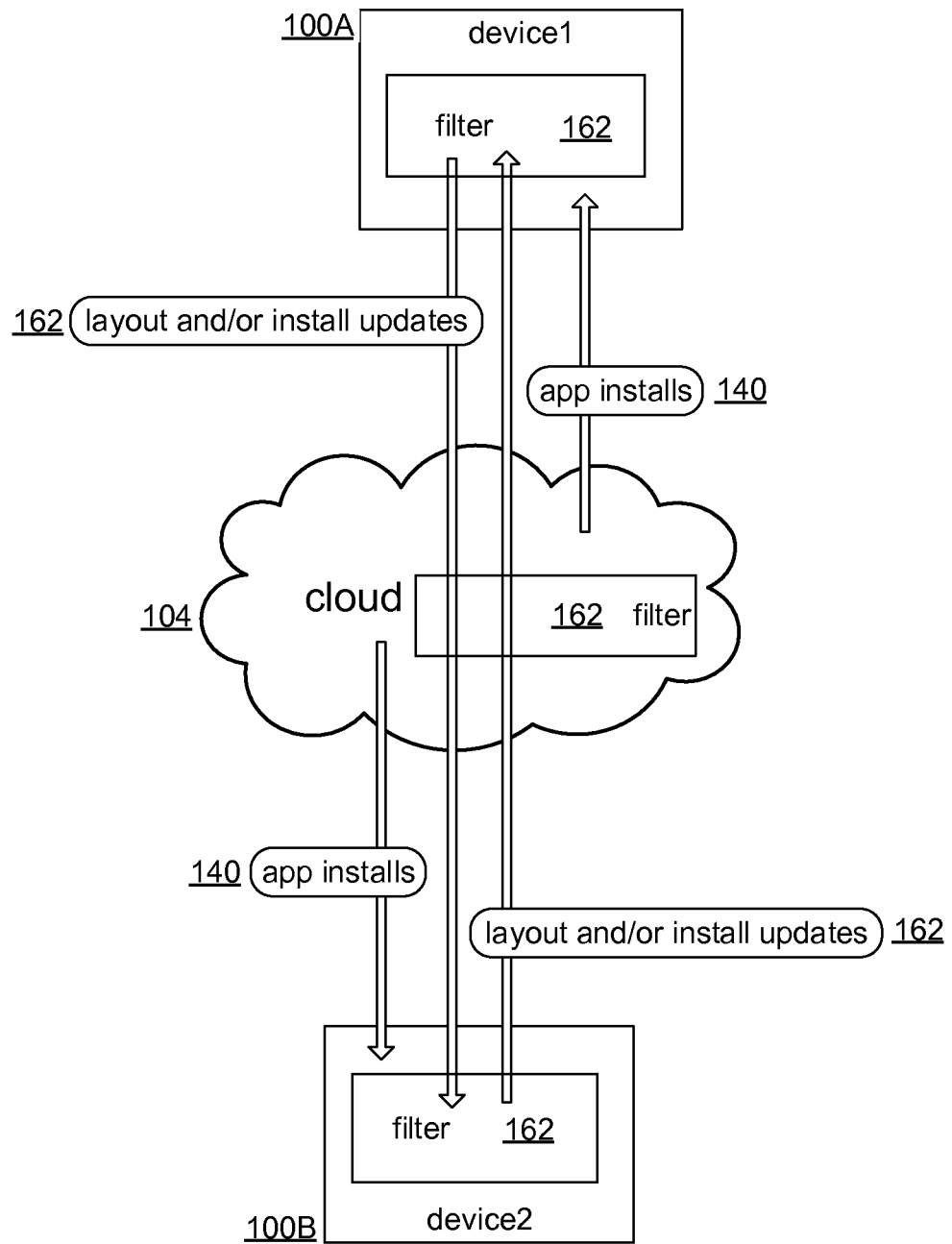
FIG. 3 shows two of a user's computing devices.

FIG. 3 shows two of a user's computing devices; a first user device 100A and a second user device 100B. For discussion, the two user devices represent any two or more arbitrary user computing devices 100 described above. The first and second user devices 100A, 100B and the cloud 104 each have synchronization software for synchronizing information between the cloud 104 and the first and second user devices 100A, 100B.

In one embodiment, the components are part of a generic synchronization framework that enables synchronization of any data specified for synchronization. Embodiments described herein synchronize user-configurable layout and/or application installation information ("configuration information" for brevity). As with most synchronization systems, each participant maintains a local copy of the synchronized data. That is, each synchronizing device (and intermediary such as the cloud 104) has a local copy of the configuration information that is to be synchronized. When one participant updates a piece of the configuration information, the update may be propagated to the other participants so that each participant's configuration information eventually substantially matches the configuration information on the other participants. Such synchronization updates are shown in FIG. 3 as layout and/or install updates 161, which may be carried by network packets. As explained below, some pieces of configuration information may be prevented from propagating by filters 162. Note that the arrows in FIG. 3 represent conceptual flow of information. In practice, the cloud may be an intermediary for updates; updates may flow from a user device to the cloud where they are applied/stored, and then the cloud may push the updates to other user devices as deemed appropriate.

Layout and/or install updates 161 (configuration updates) may stem from a wide variety of system events or user activities (for brevity, "install updates" in this Description and in the Figures refers to installing and/or uninstalling). For example, when a user initiates an application install 140 from the application service 108 to one of the user's devices, say first user device 100A, indicia of the installation is propagated among the user's devices and the cloud 104; each becomes aware of the application having been installed.

An application installation 140 or uninstallation might be initiated by the user selecting an application from a listing of available and/or purchased applications. The selecting and listing can be done locally with an application or client of the application service 108 running on a user device, for example a user may use an application launcher or GUI 116 to display indicia of available applications and to select applications for installation.

An application installation or uninstallation can be similarly initiated by a user accessing the application service 108, for example with a web browser, and by specifying an application and one or more user devices on which the application is to be installed or uninstalled. An application installation 140 can also be initiated automatically responsive to events on user devices or in the cloud 104. For example, an application installation 140 may be triggered when a new revision of an application is found to be available in the application service 108, when a version for a previously-unsupported platform becomes available, etc.

Application uninstalls may be similarly automatically triggered. For example, if a user's license for an application expires, the application service 108 may instruct the user's devices to uninstall the application. Application uninstalls may be initiated manually by any of the installation mechanisms mentioned above. In one embodiment, a GUI or an application launcher has a menu or list of installed applications that can be used to select applications for uninstallation. An application representation 128 may similarly offer a user interface element that when activated uninstalls the corresponding application (possibly with an option to specify whether the uninstall is local-only or global).

Figure 4:
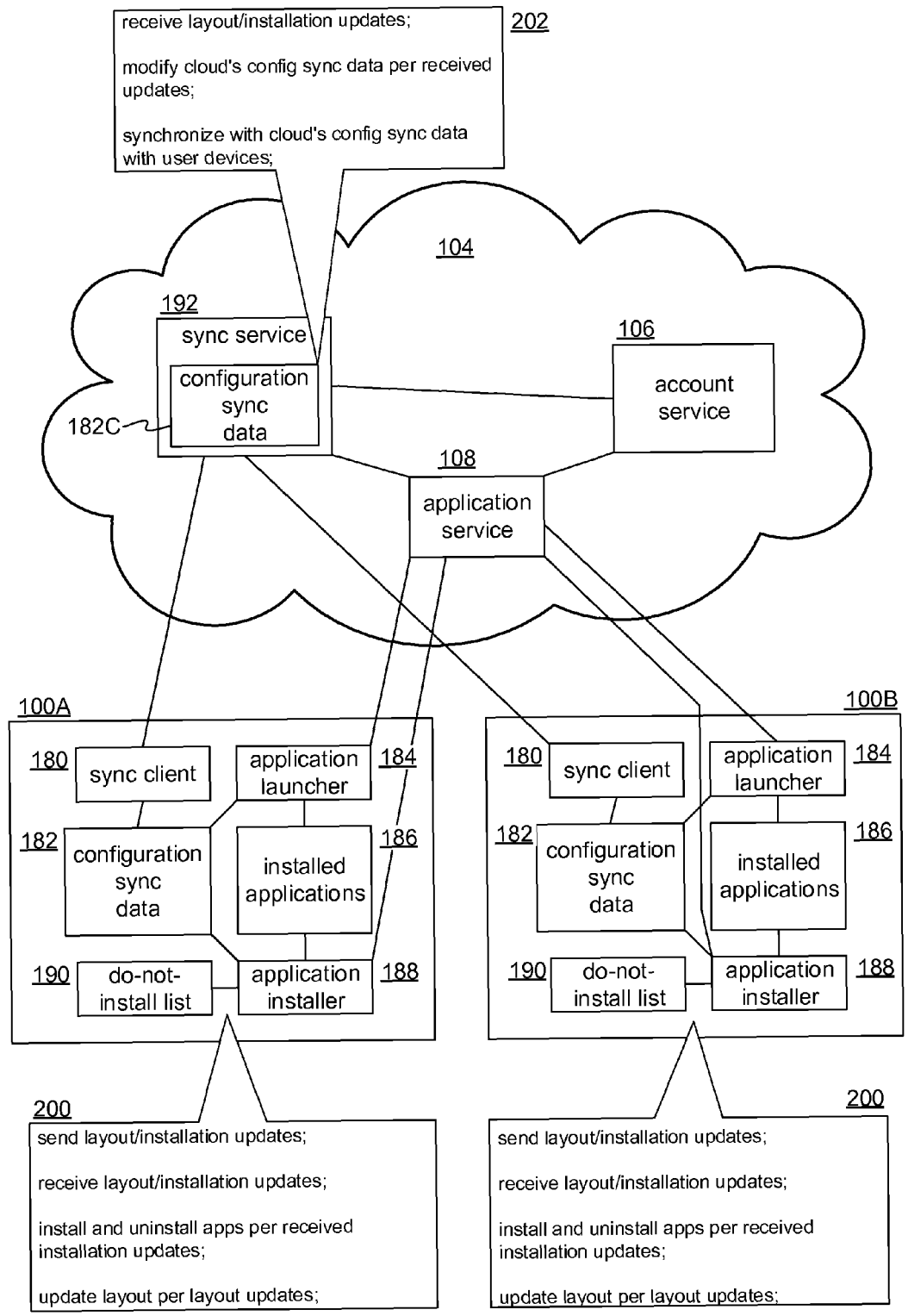
FIG. 4 shows an example system design for synchronizing configuration information among a user's devices.

FIG. 4 shows an example system design for synchronizing configuration information among a user's devices. The first and second user computing devices 100A, 100B represent any two or more of the user's devices linked with a same user identity 114, or each such user device in a subgroup of the user's devices. The first and second user computing devices 100A, 100B may each have a synchronization client 180, configuration synchronization data 182 (layout and/or installation information), an application launcher 184, a set of installed applications 186, an application installer 188, and a local (unsynchronized) do-not-install list 190. In addition, the cloud 104 has a synchronization service with centralized configuration synchronization data 182C. These cloud and device elements may cooperate to perform processes 200, 202 that configure a user's computing devices so that the user has similar experiences when using the devices.

Process 200 may include sending to the synchronization service 192 layout/installation updates that occur locally. In addition, layout/installation updates may be received from the synchronization service 192. The received updates may cause the device to install or uninstall applications or to reconfigure a user interface provided by the application launcher 184.

Process 202 may involve the synchronization service 192 receiving configuration updates from within the cloud 104 (e.g., from the application service 108) or from the first and second user computing devices 100A, 100B. The process 202 may further include applying the updates received in the cloud 104 to modify the cloud-based configuration synchronization data 182C. In turn the updates, according to possible filtering or according to the source of the updates, are propagated to either or both of the first and second user computing devices 100A, 100B. Such updates may be propagated by sending the configuration synchronization data 182C en masse to the first and second user computing devices 100A, 100B, or by sending deltas (differences between device-based configuration synchronization data 182).

FIG. 5 shows examples of configuration synchronization data 182/182C (cloud or device based) and an example of a local do-not-install list 190. In some embodiments, as shown at the top of FIG. 5, the configuration synchronization data 182/182C includes indicia of application installs associated with a user identity and possibly further associated with subgroups of the user's devices. The configuration synchronization data 182/182C in effect identifies applications that have been installed on the user's devices, perhaps including installations on devices no longer associated with the user or including applications no longer installed on any of the user's devices. The configuration synchronization data 182/182C may also have information such as a timestamp when an application was installed, a timestamp when an entry was updated or added, etc. The data may also include information linking semantically equivalent applications; revisions or platform-specific versions of what a user may consider to be the same application (e.g., versions for different operating systems).

As shown in the middle of FIG. 5, in some embodiments, the application synchronization data 182/182C may include indicia of layout-related information, that is, information pertaining to layout, arrangement, or other properties of application representations, possibly within the application launcher 184. Generally, synchronized layout information may include user-configurations such as manually specified positions of application representations, types/categories of application representations, member groups, sizes, colors, and so forth. Synchronizable layout information is explained in greater detail above.

The example local do-not-install list 190 shown at the bottom of FIG. 5 functions something like a device-specific blacklist and contains indicia of applications that are not to be installed on the corresponding user device. The local do-not-install list 190 may have entries generated when a user indicated that an application was to be installed only from a device, for example using the device's application launcher 184. When uninstalling an application, the user may be given an option of uninstalling globally (from other devices) or only locally or only for a user-designated device. When an application is to be uninstalled only from a specific user device (or device group), the application may continue to be listed as an installed application associated with the user. That is, indicia of the application may remain in cloud-based and device-based copies of the configuration synchronization data 182/182C. In sum, an application listed in the copies of the configuration synchronization data may be automatically installed through synchronization on a user's devices that do not list the application in their respective do-not-install lists (possibly subject to further restriction by other mechanisms such as filtering).

In one embodiment, the configuration sync data 180/182 shown at the top of FIG. 5 (application installs) has an "uninstall" state that indicates whether corresponding application has been globally uninstalled. In other words, the top table of FIG. 5 may have a column titled "uninstall" that is marked for applications that have been globally uninstalled. Note any of the tables might have the application linking information such as the "same app" column shown in the top table of FIG. 5.

Figure 6:
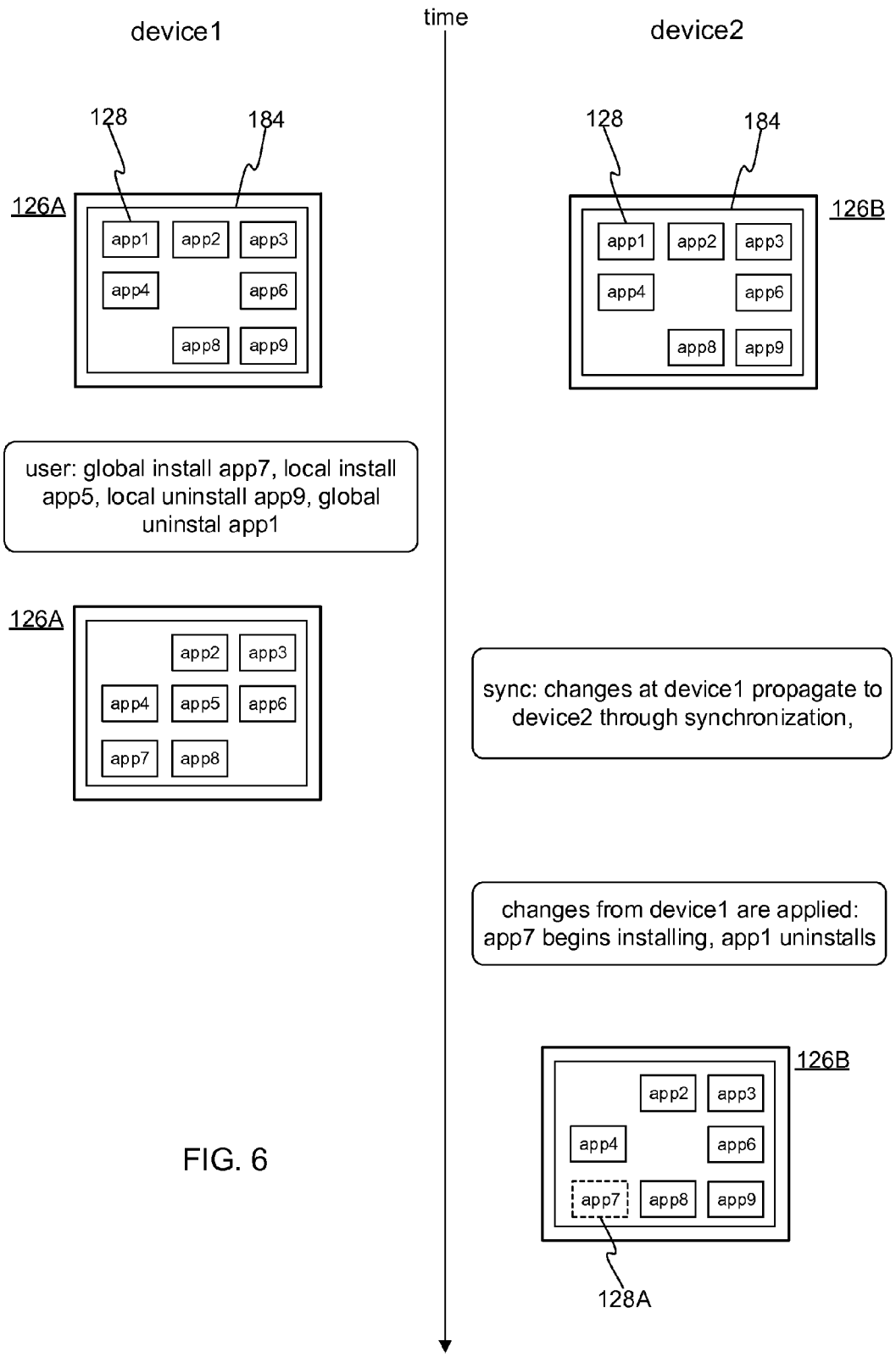
FIG. 6 shows an example of installation information synchronization.

FIG. 6 shows an example of installation information synchronization. A chronological sequence is described with a first display 126A of the first user device 100A shown on the left and a second display 126B of the second user device 100B shown on the right. Starting chronologically from the top of FIG. 6, the user's two devices initially each have a same set of installed applications 186; app1-app4, app6, app8, and app9. The user performs a sequence of configurations, such as installing app7, installing app5 locally-only, uninstalling app9 local-only, and uninstalling app1. These application installation changes can be performed with any of the mechanisms discussed above. In this example, the changes are performed by the user using the application launcher 184 on the first user computing device 100A; other local or remote UI may be used, and some installations/uninstallations may result from automatic processes. For convenience, this example involves multiple installation changes over a short time span, however, the same or other installation changes could be performed in different orders and at different times.

In the case of installing application app7, the user may have interacted with the local application launcher 184 or an appstore type of application to select app7 for installing. The application launcher 184 of the first user device 100A may download data for installing "app7". An entry indicating "app7" as an installed application is added to the local configuration synchronization data 182. The entry might be added by the installing software, or a synchronization component such as the local synchronization client 180 might detect the installation of "app7" and add the entry. The synchronization client 180 then forwards the update (new entry for "app7") to the synchronization service 192, which adds the new entry for "app7" to its configuration synchronization data 182C.

When the synchronization service 192 next synchronizes with the second user device 100B, the update for "app7" is sent to the synchronization client 180 of the second user device 100B, which updates its copy of the configuration synchronization data 182. The application installer 188 or other system service on the second user device 100B detects or receives notice of the update, reads its copy of the configuration synchronization data 182, identifies "app7" as needing to be installed, and in the background downloads and installs "app7" from the application service 108. In one embodiment, as shown in the lower right part of FIG. 6, while application "app7" is installing or scheduled for installing, a place-holding application representation 128A for "app7" has some graphic properties to indicate that the application is not yet installed; a progress bar; transparency, a designated color or symbol, etc. The place-holding application representation 128A can perhaps be partially configured (e.g., moved, resized, added to a group) and those changes might also be synchronized to corresponding application representation on the first user device 100A.

In the case of the local-only install of app5 at the first user device 100A, app5 is installed from the cloud 4 and added to the do-not-install list 190 of the first user computing device 100A. This may result from either the user having specifically designated the installation as local-only, or from the first user device 100A having determined that synchronization is not appropriate for app5 (e.g., found that app5 has a hardware or software feature or requirement that limits is applicability to other devices). The presence of app5 in the local do-not-install list 190 prevents app5 from being added to the configuration synchronization data 182; the user's other devices are not informed of the installation of app5.

In the case of the local-only uninstall of app9 on the first user device 100A, app9 is uninstalled only on the first user device 100A and is added to the do-not-install list 190 on the first user device 100A. If app9 was listed in copies of the configuration synchronization data 182/182C it may remain therein; app9 may continue to be install-synchronized on the user's other devices.

The global uninstall of "app1" at the first user computing device 100A flows through the synchronization components to the cloud 104 and to the second user computing device 100B, causing application "app1" to be background-uninstalled at the second user device 100B.

The appearance of the application launcher 184 on the second user device 100B is shown at the lower right corner of FIG. 6 and corresponds to which applications are installed and not installed on the second user computing device 100B. Note that application install/uninstall synchronizations need not be accompanied by user interface or layout updates such as to the application launcher 184.

To summarize, applications can be installed and uninstalled on one of a user's devices and automatically installed and uninstalled on other of the user's devices that are inter-linked for synchronization (inter-linking can be automatic based on a common user identity). In some cases, applications can be excluded from synchronizing using local do-not-install lists. Application installs indicated by received synchronizations are not installed if listed in the local do-not-install list, and applications in the local do-not-install list are not synchronized to the cloud 104.

FIG. 7 shows an example of layout information synchronization. At the top of FIG. 7 the first and second user devices 100A, 100B initially have a layout of application representations, for example in the application launchers 184. The user interacts with the application launcher 184 at the first user device 100A to create group3 200, move the app3 representation to group3, reorder the app1 and app2 representations, change the color of the app2 representation, remove the app4 representation, and resize the app1 representation. In one embodiment, the changes are applied to a configuration file or other non-volatile set of configuration data used by the application launcher 184. The local synchronization client 180 detects the changes and propagates them up through the cloud 104 to the second user device 100B, where the changes are synchronized to the configuration file/data used by the second device's application launcher 184. The application launcher 183 reads its configuration file/data and updates its layout accordingly. As shown in FIG. 7, the layout of the application launchers 184 eventually match one another, perhaps with some differences attributable to differing sizes or resolutions of the first display 126A and the second display 126B (there is no requirement that synchronized user devices have any hardware equivalences; synchronized user devices may have different architectures, display sizes, etc.). In some cases synchronized layouts may not have the same exact appearance due to factors such as different screen sizes, differing sets of installed applications, or others. A flow layout approach may be used to reproduce some aspects of a layout, such as the relative order of application representations, as shown in the example of FIG. 7.

As mentioned above, synchronizing devices and the cloud 104 might have filters 162 to prevent certain updates from synchronizing. A filter 162 can prevent updates from being applied or from being forwarded. For example, at the cloud 104 application installs might be filtered out for devices that are incompatible or do not have license or authorization, for example. Filtering can be performed on any of a variety of factors such as application attributes, licensing information, user device attributes, software or hardware requirements, user preferences regarding synchronization, or others.

When a second or later device becomes associated with a user, perhaps by enabling synchronization or by adding the user's network identity to the second device, the device might immediately begin synchronizing immediately or when the user logs in to the later device.

Regarding the synchronization of application installations, when multiple application installs are queued by a user device per synchronization updates, the order of installation can be prioritized according to factors such as which applications are most recently used on the source user device, the order applications appear in the application launcher of the source user device, order of installation on the source device, frequency of use of the application on the source device and/or other devices, user ratings, etc. In addition, lack of resources such as bandwidth or storage on a user device may delay or prevent some installations. When some applications cannot be installed due to insufficient space, installation prioritization (which applications will or will not be installed) may be similarly determined.

Configuration updates that are to be synchronized might carry with them a timestamp indicating when the update at a source. The timestamps may be used to resolve conflicts between updates, generally with later updates superseding conflicting earlier updates.

As noted above, a synchronization system can be designed to account for application incompatibilities. When an application is available for incompatible platforms or user devices, the synchronization system might propagate installs of an application intelligently to only the devices where the application can execute. In addition, continuing indication of an application as being installed can be repeatedly ignored or blocked at or for incompatible user devices but when a compatible version becomes available (or a device becomes compatible) the compatible version is automatically installed for the corresponding user device, perhaps much later than the first time the application was installed by the user. In this way, even when the user has incompatible devices, respective versions of the same application might be automatically installed via synchronization.

A user device might also be equipped with logic to detect, when an application is being installed, whether the application has device dependencies (hardware and/or software) that indicate the application might not function or have use at other devices. Such applications might be automatically excluded or filtered from synchronizing. If another user device changes and begins to satisfy the dependency, the application might then be synchronized to that device.

As mentioned above, the synchronization techniques can be readily extended to groupings of a user's devices and to groupings of applications. For example, the user might designate two devices as "work" devices and three devices as "personal" devices. The grouped devices synchronize among themselves. A global group may also be used. Applications or devices may be added to or excluded from multiple groups. In one embodiment, the user is allowed to specify particular application groups in the application launcher as being synchronized or not, which might control either or both layout and install synchronizations that affect the groups. In effect, the user might have one portion of UI layout designated for synchronization and another portion designated as not to be synchronized.

In yet another embodiment, a user's application layout and installation information is stored in the cloud 104 even when there are no longer any devices associated with the user. If the user then associates a device with the user's identity, the stored cloud information is automatically synchronized to the new device and the device begins to install applications and configure layout according.

Regarding local do-not-install lists, if a user manually installs an application on a device that lists the application in its do-not-install list, the application may be removed from the do-not-install list on that device.

A preview application representation can be displayed when a user has exceeded a number of devices permitted to install a given application. That is, there may be an indication to the user that an application would be installed per synchronization but for the fact that the application lacks a license. When the user selects the preview application representation, the user may be notified that a device limit has been exceeded and may be given guidance or access to a means to remedy the situation, for example by removing the application from one of the user's devices.

Synchronization might be able to be manually disabled by the user on individual devices or globally. Similarly a group policy control might be provided to allow administrators to regulate synchronization implementation.

Figure 8:
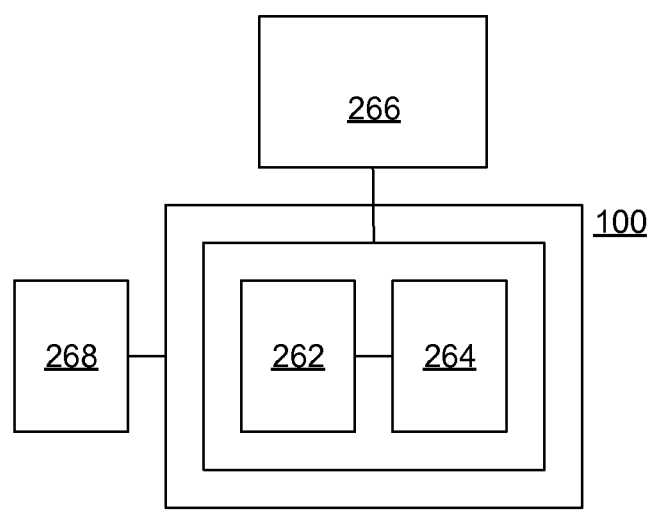
FIG. 8 shows an example computing device on which embodiments may be implemented.

FIG. 8 shows an example of a computing device 100 on which embodiments described above may be implemented. The computing device 100 may have one or more displays 266, as well as a storage device 262 and a processor 264. These elements may cooperate in ways well understood in the art of computing. In addition, input devices 268 may be integrated with or in communication with the computing device 100. The display 266 may be any variety of devices used to display a signal outputted by computing devices, including, for example, solid-surface displays (e.g., plasma, liquid crystal), projectors, touch-sensitive surfaces, and others. The computing device 100 may have any form factor or may be incorporated in another device. For example, touch-sensitive control panels are often used to control appliances, robots, and other machines. The computing device 100 may be in the form of a handheld device such as a smartphone, a tablet computer, a gaming box, a headless server, or others.

Embodiments and features discussed above can be realized in the form of information stored in volatile or non-volatile computer-readable or device-readable devices. This is deemed to include at least devices such as optical storage (e.g., compact-disk read-only memory (CD-ROM)), magnetic media, flash read-only memory (ROM), or any other devices for storing digital information in physical matter. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of synchronizing application installations between devices, the method comprising:
    linking, at a network service, user devices associated with a user;
    in accordance with the linking, synchronizing application installations and uninstallations through the network service between the user devices, wherein by default when an application is installed or uninstalled from one user device, the synchronizing causes the application to be installed or uninstalled at another user device;
    maintaining global installation information and local installation information, the global installation information indicating which applications have global install status and indicating which applications have global do-not-install status, the local installation information indicating which applications have local-only install status on which of the devices and indicating which applications have local-only do-not-install status on which of the devices; and
    wherein the synchronizing is performed according to the global installation information and according to the local installation information, and wherein to determine which applications will be installed and uninstalled on which of the devices, the local installation information is given priority over the global installation information when determining which applications to install and uninstall on any of the devices.

2. A method according to claim 1, wherein the network service includes an application store from which applications are installed to the user devices based on corresponding requests received from the user, and when an application is installed from the application store to one of the user devices the synchronizing causes the application to be automatically installed from the application store to another of the user devices.

3. A method according to claim 1, further comprising maintaining at each user device and at the network service respective copies of the global installation information that is synchronized between the other user devices and the network service, and wherein the user devices automatically install and uninstall applications according to which applications are listed and not listed in the global installation information.

4. A method according to claim 1, further comprising receiving input inputted by the user and indicating that a given application is to be installed only on a given user computing device, and in response installing the given application on the given device and adding an indicator of the given application to the local installation information, the presence of the indicator causing the given application to not be synchronized with other devices of the user.

5. A method according to claim 1, further comprising filtering synchronizations of application installation updates according to properties or compatibility information about corresponding applications.

6. A method according to claim 1, further comprising providing a user interface element that can be interacted with by the user to indicate, when installing or uninstalling an application, whether or not the installation or uninstallation of the application is to be synchronized.

7. A method according to claim 1, further comprising providing a user interface element configured to be interacted with by the user, in association with an application, to set a setting indicating whether or not the application is to installed or uninstalled locally or globally.

8. A user computing device associated with a user and comprising:
- a display, storage, and a processor;
- a protocol stack configured to enable the user computing device to communicate over a network with a management service that maintains associations between users and a plurality of user computing devices and to communicate with an application service that provides applications over the network for installation on the plurality of user computing devices, the associations including an association between the user computing device and an other user computing device;
- a user interface configured to, when displayed by the display, display indicia of applications installed on the user computing device, the user interface further configured to be interacted with by a user to select from among the indicia of applications to uninstall from the user computing device;
- global application installation information listing applications globally installed and globally uninstalled based on input received from the user, wherein the global application installation information is synchronized between the user computing device and the other user computing device based on the association, and wherein when applications are installed and uninstalled via the user interface the global application installation information is updated accordingly;
- local application installation information listing applications locally uninstalled on the user computing device; and
- a synchronization component that synchronizes the global application installation information with the other user computing device based on the association, the synchronization component enabling application installs and uninstalls to be automatically synchronized between the user computing device and the other user computing device based on the local and global application installation information by giving priority to the local application installation information.

9. A user computing device according to claim 8, further comprising an application install component that installs applications from the application service, which is part of a computing cloud, the computing cloud linking the user computing device and the other user computing device and storing a copy of the global application installation information.

10. A user computing device according to claim 8, wherein the user computing device automatically prevents some application installations on the user computing device from being propagated to the other user computing device.

11. A user computing device according to claim 8, wherein an application listed in the global application installation information at the user computing device is not installed on the user computing device when it is determined, according to a feature of the user computing device or the application, that the application should not be installed.

12. A user computing device according to claim 11, wherein the feature corresponds to compatibility between the user computing device and the application.

13. A user computing device according to claim 8, wherein when multiple applications are to be installed on the user computing device according to the global application installation information, the user computing device prioritizes an order of installing the multiple applications.

14. A user computing device according to claim 8, wherein when an application is manually installed at the user computing device per user input, the application is automatically listed in the global application installation information, and when an application is manually uninstalled at the user computing device the application is automatically removed from the global application installation information.

15. A user computing device according to claim 8, wherein the management service comprises an application service, a user account service, and a synchronization service, the application service providing a set of applications for installation to arbitrary devices of users having user identities registered with the user account service, the synchronization service automatically providing application installation and uninstallation synchronization service between user computing devices that are associated with a same user identity.

16. A user computing device according to claim 8,
- wherein the user interface comprises a user interface element configured to, based on a user input directed to the user interface element, provide an indication of whether an application, selected from among the indicia of applications, is to be globally uninstalled or locally uninstalled, and
- wherein when an application is uninstalled via the user interface and the user interface element indicates that the selected application is to be globally uninstalled the global application installation information is updated accordingly, and wherein when an application is uninstalled via the user interface and the user interface element indicates that the selected application is to be locally uninstalled the local application installation information is updated accordingly.

17. A method of synchronizing software installations between user devices, the method comprising:
- providing application packages of applications from an application installation service, each application associated with one or more application packages, the application installation service comprising a network-based service that: stores the application packages for installation to user devices, tracks which applications are associated with which user identities, and accesses user identities and user device associations indicating which user devices are associated with which user identities;
- accessing groups of synchronization settings, the groups associated with the user identities, respectively, wherein each group of a corresponding user identity comprises synchronization settings for respective applications associated with the corresponding user identity, each synchronization setting indicating whether a corresponding application is to be synchronized among the user devices associated with the corresponding user identity, and wherein the groups are updated to reflect installations of applications to the user devices via the application installation service; and
- using the synchronization settings to automatically control installations of the application packages to the user devices, the using including:

whenever any synchronization setting is modified to indicate that a corresponding application is to be installed on all user devices of the corresponding user identity:
automatically determining which user devices associated with the corresponding user identity do not have an application package of the application installed and signaling for installation of one or more application packages of the application to the determined user devices,
wherein global installation information of the user devices is maintained to indicate which applications have been globally installed or globally uninstalled on which of the user devices,
wherein local installation information of the user devices is maintained to indicate which applications have been locally manually uninstalled on which of the determined user devices, and
wherein the local installation information is accessed given priority over the global installation information to determine whether the application to be installed indicates that the application to be installed has been manually uninstalled from any of the user devices, and based thereon preventing installation of the one or more application packages on any of the user devices indicated by the local installation information to have locally uninstalled the application.

18. A method according to claim 17, wherein the using the synchronization settings further comprises: whenever any synchronization setting is modified to indicate that a corresponding application is not to be installed on all user devices of a corresponding user identity, determining which user devices associated therewith are to have a corresponding application package uninstalled.

19. A method according to claim 17, further comprising accessing user settings of the user identities, respectively, each user setting indicating which user devices of an associated user identity associated are or are not subjected to automatic application installation synchronization.

* * * * *